Figure 3:
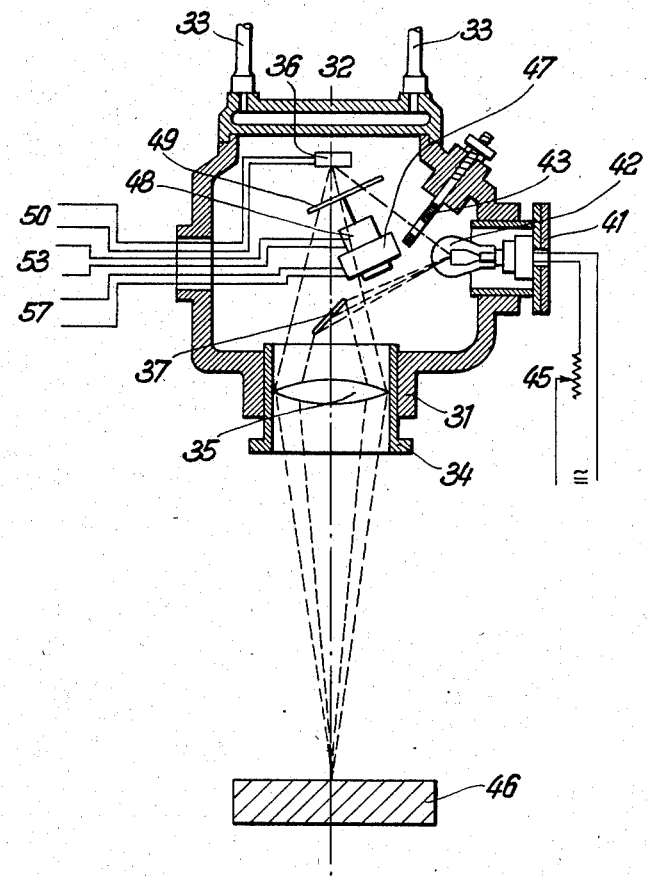

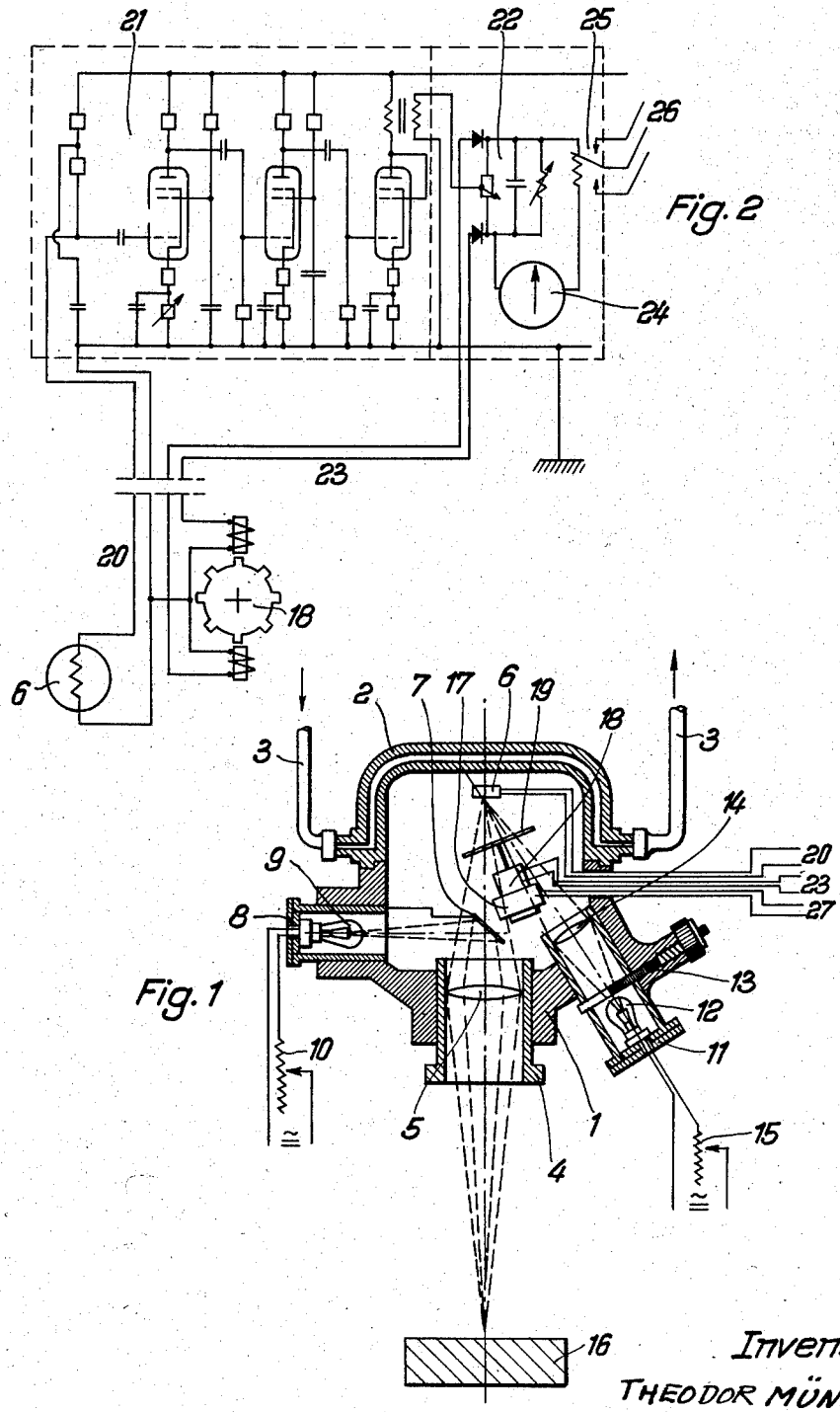

2,886,970

APPARATUS FOR MEASURING TEMPERATURES

Theodor Münker, Langenberg Rhineland,
am Bokenbusch, Germany

Application March 23, 1953, Serial No. 344,015

Claims priority, application Germany March 24, 1952

4 Claims. (Cl. 73—355)

This invention relates to an apparatus for measuring temperatures by using a photo-cell or photoelectric resistance sensitive to heat radiation emanating from an object to be measured.

The main object of the invention is to provide means affording a measurement of temperature independent of the actual state of the surface of the object to be measured.

A further object is to provide means contributing to an efficacious apparatus especially suitable for such temperature measurement.

As is known, the heat radiation emanating from a hot object to be measured generally does not give the absolute value of the temperature of the object to be measured but varies widely, depending on the radiating power or property of its surface, e.g., on its smoothness or roughness. Therefore, it has already been proposed to provide a glowing wire pyrometer with a second source of light, to focus its image on the surface of the object to be measured for measuring its reflecting power and to calculate the temperature of the object by two pyrometer adjustments and through complicated mathematical equations. This known method of measuring temperatures depends on the skill of the pyrometer observer and is time consuming and uncertain. Therefore it is not suitable for the purpose of continuous supervision during manufacturing of workpieces of which the surface qualities are irregular and subject to variations.

It is therefore still another object of the invention to provide means overcoming these and other disadvantages. This invention primarily consists of an apparatus for measuring or evaluating temperatures by the heat radiation emanating from the object to be measured, wherein an additional radiation is directed to the measuring spot or location on the surface of the object and the total of the self-radiation emanating from said spot and the additional radiation reflected by said spot is evaluated by a device responsive to heat radiation as the measure for the temperature at the measuring spot and wherein the additional radiation is so chosen that its measure-effective portion practically completes or complements the measure-effective portion of the self-radiation of the object to the value of the measure-effective black radiation of the object.

The present invention is based on the knowledge confirmed by numerous experiments that the sum of emitted and reflected heat radiations measured by the apparatus herein disclosed is widely independent of the qualities of the surface of the object and thus of its reflecting power. Thus, a decrease in the reflecting power caused, e.g., by increased roughness, oil or soot spots corresponds with a practically identical increase of the self-radiation and vice versa. Furthermore, that means that the additional radiation directed on the spot of measure has the same effect on the spacial portion of the total radiation of the object influencing the device responsive to heat radiation like a cover completely surrounding the object and by equal temperature of its inner walls making its radiation a black one. Therefore the apparatus according to the invention affords the possibility of creating an artificial hollow chamber radiation and of measuring the true temperature of an object by simple means, namely practically by a small additional source of radiation. Experiments have proved that this novel system of radiation measuring according to the invention practically give the same temperature values as a contact measuring instrument.

The new apparatus for measuring temperatures is especially suitable for supervising the constancy of temperature of heat treatment process during the course of manufacture of which the workpieces usually have different qualities of surface and correspondingly different qualities of radiation due to influences incapable or unworthy of being controlled.

However, as experience has proved, it is also possible to perform a rather exact measuring of temperature by appropriately calibrating the measuring apparatus or instrument and the source of additional radiation. There is no difficulty in calibrating the measuring instrument itself for black radiation temperatures by a hollow chamber radiating device. The calibrating of the source of additional radiation for providing the correct additional radiation according to the invention may be empirically done by aiming the measuring instrument to be calibrated for black radiation temperatures on an object of which the absolute temperature is known by the aid of a pyrometer or other means and by varying the additional radiation to a value causing the measuring instrument to also indicate the absolute temperature of the object.

Therefore, the measuring apparatus according to the invention is sufficiently correct for most of the technical processes of heat treatment and combines the advantages of remote radiation measuring with the insensitivity of temperature measuring by contact against changes in the qualities of the surface of the object to be measured. Therefore the new measuring instrument leads to a convenient and reliable system especially for plant supervision.

A further object of the invention is to provide means employing an additional radiation comprising also optically visible rays. By such radiation, the measuring spot on the surface of the object hit by the additional radiation becomes optically visible and can therefore be easily adjusted.

Additional features of the invention and especially of the apparatus suitable for carrying out the invention are hereinafter referred to and claimed in the appended claims in connection with two preferred embodiments of the invention as hereinafter described and illustrated in the accompanying drawings in which:

Fig. 1 is a cross-section of the measuring head of an apparatus embodying the invention, Fig. 2 is a wiring diagram of the electric parts of the apparatus shown in Fig. 1, and Fig. 3 is a cross-section of a further embodiment of the measuring head similar to that shown in Fig. 1.

Referring more particularly to the apparatus according to the invention a measuring head is schematically shown in Fig. 1 and consists of the chassis 1 and the cover 2 forming a housing, which has double walls and therefore can be cooled by any known cooling system 3.

In the center of the chassis 1 there is the borehole for an optical system of which the tube 4 is arranged to be axially adjusted in said borehole by known means such as a screw thread mounting, said tube encompassing a collecting lens 5 made of heat transparent material such as glass or crystal. In the optical axis of the collecting lens 5 there is arranged a device 6 responsive to heat radiation, e.g. a photocell or a photo-electric resistance, carried by a support (not shown) and arranged on the chassis 1 of the housing. In the path of rays between the collecting lens 5 and the heat responsive device 6 a semi-transparent mirror or mirror-like element 7 is arranged at an angle of 45°, to the optical axis of the collecting lens 5. In well known manner the mirror may be semi-transparent throughout its whole area or may consist of both transparent and light-impervious areas in a pattern-like arrangement. The mirror may also be inserted only in a part of the bundle of rays.

In a second borehole of the chassis 1 shown at the left-hand of Fig. 1 there is arranged a further tube or mounting 8 receiving an energy source 9 of additional radiation, such as a carbon filament lamp or another source of visible as well as thermal radiation. Preferably the mounting or tube is also arranged to be axially adjusted. The source 9 of radiation is electrically heated under the control of an adjustable resistance 10. The source 9 of additional radiation, the ray-dividing mirror 7 and the collecting lens 5 are adjusted to one another in such a way that the rays emanating from the source 9 are directed into the axis of the lens 5 by the mirror 7.

In a third oblique borehole of the chassis 1 shown at the right-hand side of Fig. 1 there is arranged the device for the standard radiation. This device consists of the tubular mounting 11 preferably arranged to be axially adjusted in the bore-hole, the standard radiating device 12, e.g. a body electrically heated, a device 13 for controlling the standard radiation, e.g. a controllable diaphragm or filter, and a collecting lens 14. The heating of the standard radiating device may be controlled by a control device 15, e.g. a controllable resistance. For taking into account the peculiarities of radiation of a predetermined surface location of the object 16 to be measured, preferably there may be used a standard radiating device consisting of the same material as the object to be measured. For this purpose the standard radiating device 12 may be constructed to be exchanged.

Furthermore, on the chassis 1 there is mounted a motor 17 carrying on its shaft a generator 18 and a slotted disk or like radiation interceptor means 19. The latter is mounted and so constructed as to alternatively allow the passage of the heat radiation emanating from the object 16 to be measured or from the standard radiating device 12, respectively, towards the heat radiation sensitive device 6.

The mutual positions of the source 9 of additional radiations, the heat radiation sensitive device 6, and the semi-transparent mirror 7 and the focal length of the collecting lens 5 are related in such a way that for any given distance of the object 16 to be measured from the measuring head there can be adjusted a position of the lens 5 to focus the source 9 of additional radiation by means of the semi-transparent mirror 7 on the object 16 to be measured as well as the radiation emanating from said object 16 through said mirror 7 and the openings of the slotted disk 19 on the heat radiation sensitive device 6. Furthermore, the standard device 12, the heat radiation sensitive device 6 and the lens 14 are disposed in such a way that the lens 14 focuses the standard radiation device 12 through the openings of the slotted disk 19 on the heat radiation sensitive device 6.

Said device 6 may consist of a known photocell or photo-electric resistance and delivers electric impulses corresponding to the received radiation by the wires 20 to the input of a three stage amplifier 21 (see Fig. 2), the output of which is connected to a phase-bridge 22. The latter is also connected by the wires 23 to the field-poles of the generator 18, the rotor of which has poles corresponding in position and number to the slots in the disk 19. By this known arrangement the zero-indicator device 24 can indicate positive as well as negative differences between the radiation emanating from the object 16 to be measured and the standard radiation at 12. The described measuring apparatus may also be used for giving control orders by connecting the output of the phase-bridge 22 in series with the zero-indicator device 24 to a relay device 25 the control orders of which are transferred by the three-wire connection 26 to appropriate devices (not shown).

The synchronous motor 17 for the slotted disk is fed from the main supply by the wires 27.

The embodiment shown in Fig. 3 only differs from the measuring head or housing shown in Fig. 1 by a single source (42, see Fig. 3) for both the additional and the standard radiations instead of separate sources (9 and 12, respectively, see Fig. 1).

The measuring housing consists of the chassis 31 and the cover 32 which like the cover 2 of Fig. 1 has double walls and therefore can be cooled by a cooling system 33.

In the chassis there is the borehole for an optical system of which the tube 34 is arranged to be axially adjusted in said borehole by known means, said tube supporting a collecting lens 35 made of heat transparent material. In the optical axis of the collecting lens 35 there is arranged the heat radiation sensitive device 36, e.g. a photocell or a photo-electric resistance, carried by a support (not shown) and arranged at the rear on the chassis 31. In the path of rays between the collecting lens 35 and the heat radiation sensitive device 36 a mirror 37 is inserted in such a way that the part of the radiation emanating from the source 42 and falling on the mirror 37 is directed into the axis of the lens 35.

In a second borehole of the chassis 31 the above-mentioned source 42 of radiation is mounted by means of an axially adjustable tubular mounting 41. The radiation emanating from said source 42 is directed partly, as already has been described, by the mirror 37 along the axis of the lens 35 and to the respective surface location of the object 46 to be measured and partly passes a control device 43, e.g. an adjustable diaphragm or filter, towards the heat radiation sensitive device 36. Also with this embodiment the peculiarities of radiation of the object 46 to be measured may be taken into account by constructing the standard radiation device 42 as an exchangeable structural element the source of radiation of which consists of the same material as the object 46 to be measured.

Furthermore, on the chassis 31 there is mounted by means of a bracket (not shown) a motor 47 carrying on its shaft a generator 48 and a slotted disk 49. The latter is mounted and so constructed as to alternately allow the passage of the heat radiation emanating from the object 46 to be measured or from the source of radiation 42, respectively, towards the heat radiation sensitive device 36.

As has already been described in connection with the embodiment described in Fig. 1, the heat radiation sensitive device 36 delivers electric impulses by the wires 50 to the input of a three-stage amplifier 21 (see Fig. 2), the output of which is connected to a phase-bridge 22. Said bridge is also connected through the wires 23 or 53 resp. to the field-poles of the generator 48, the rotor of which has poles corresponding in position and number with the slots in the disk 49. The operation of this device is the same as that of the device shown in Fig. 1. The synchronous motor 47 for the slotted disk is fed from the main supply by wires 57.

Having thus described the invention, what is claimed as new and desired to be secured by Letters Patent is:

1. An apparatus for evaluating the temperature of an object through heat radiation from a heat radiating surface of said object which is subject to variations in its reflectivity and emissivity factor; comprising a housing having a front wall and rear wall, first tubular means passing through the front wall of said housing thereinto, heat energy responsive means located adjacent the rear wall of and within said housing and in alignment with said first tubular means, said responsive means being adapted to receive via said first tubular means heat radiation emitted from a predetermined location of said object surface, said responsive means being further positioned remote from said location, second tubular means opening into said housing and spaced from said first tubular means and said responsive means, a source of radiant energy producing heat radiation disposed remote from said location and supported within said second tubular means, means for directing predetermined heat radiation from said source via said second tubular means along the path of heat radiation passing through said first tubular means onto said location of said surface for reflection therefrom commensurate with the reflectivity of said surface at said location, control means for predetermining said heat radiation emitted by said source and directed onto said location so that the heat radiation reflected from said location supplements the heat radiation emitted from said surface location, whereby both said heat radiations when received by said heat responsive means amount to a total value of radiation which is substantially equal to the value of radiation emitted by a black body at the temperature of said surface at said location, and means operatively connected to the output of said heat radiation responsive means for evaluating the temperature of said object independently of variations in the reflectivity and emissivity factor of its surface at said location.

2. An apparatus according to claim 1, including a further radiant energy source within said housing and located remote from said surface location, means for controlling the intensity of the heat radiation emitted from said further radiant energy source to a value which is substantially equal to the value of radiation emitted by said surface at said location, means for directing said latter controlled radiation onto said radiant heat energy responsive means in such a manner that no interreflections occur between said further radiant energy source and said surface location, said last-mentioned directing means including a slotted disc and drive means for rotating said slotted disc through which heat radiation from said further radiant heat energy source intermittently passes to be sensed by said heat energy responsive means alternately with said heat radiations emitted and reflected from said surface location, and means responsive to the difference existing between the outputs of radiant heat energy responsive means which outputs results on the one hand from the combined emitted and deflected heat radiations from said surface location and on the other hand from heat radiation emanating from said further radiant energy source for evaluating the temperature of said surface location.

3. An apparatus according to claim 1, including a mirror-like element angularly arranged to the path of said combined emitted and reflected heat radiations from said surface location to said radiant heat energy responsive means, whereby said means for directing said heat radiation onto said surface location and said mirror-like element are oriented to each other in such a manner that said heat radiation before being reflected by said surface location is deflected by said mirror-like element for alignment with said combined emitted and reflected heat radiations from said surface location.

4. Apparatus for evaluating the temperature of an object through heat radiation from a heat radiating surface of said object which is subject to variations in its reflectivity and emissivity factor; comprising a chassis, a first collecting lens of heat radiation transparent material, said lens having an optical axis and being mounted transversely within said chassis for axial adjustment therein and for transmitting radiation to and from said object, means responsive to heat radiation located on the optical axis of said lens, a source emitting radiant energy including both visible and heat radiations and located remote from said object, control means for predetermining said radiant energy emitted by said source and directed onto said location so that the radiant energy reflected from said location supplements the heat radiation emitted from said surface location whereby both said heat radiations when received by said heat responsive means amount to a total value of radiation which is substantially equal to the value of radiation emitted by a black body at the temperature of said surface at said location, semi-transparent mirror means in the path of said visible and heat radiation from said source and adapted to direct toward said object both said visible radiation and said heat radiation emanating from said source, said mirror means being further arranged and adapted to pass through itself both said self-emitted and said reflected radiations from said object, standard radiation means for emitting a controllable standard intensity of heat radiation, said standard radiation means being axially adjustable in said chassis, a second collecting lens for directing radiation from said standard radiation means towards said means responsive to heat radiation, radiation interceptor means rotatably mounted in the path of radiation from said standard radiation means, as well as in the path of radiation from said object, said radiation interceptor means being adapted to alternately allow passage of heat radiation from said object and from said standard radiation means, respectively, to strike said means responsive to heat radiation, current generator means operatively mounted to rotate in unison with said radiation interceptor means and to generate a control current, amplifying means operatively connected to said means responsive to heat radiation and having an output therefrom, bridge means operatively receiving said control current from said current generator and also said output from said amplifying means, and indicator means operatively connected to said bridge means, whereby radiation from said standard source and the total of self-emitted and reflected radiations from said object will be alternately sensed by said means responsive to heat radiation and a value indicative of temperature difference will be shown on said indicator means.

References Cited in the file of this patent
UNITED STATES PATENTS

| | | |
|---|---|---|
| 1,379,172 | Crites | May 24, 1921 |
| 1,918,206 | Ermisch | July 11, 1933 |
| 2,611,541 | Gray | Sept. 23, 1952 |
| 2,627,202 | Strong et al. | Feb. 3, 1953 |
| 2,690,511 | Elion | Sept. 28, 1954 |
| 2,737,809 | Fastie | Mar. 13, 1956 |

FOREIGN PATENTS

| | | |
|---|---|---|
| 411,891 | Great Britain | June 11, 1934 |
| 636,199 | Germany | Oct. 14, 1936 |
| 640,711 | Great Britain | July 26, 1950 |

OTHER REFERENCES

Harrison: "Industrial Use of Radiation Pyrometers under Non-Blackbody Conditions," Journal of the Optical Society of America, vol. 35, No. 11, pp. 708–722.